(12) United States Patent
Abernathy (10) Patent No.: US 7,298,869 B1
(45) Date of Patent: Nov. 20, 2007

(54) MULTISPECTRAL DATA ACQUISITION SYSTEM AND METHOD

(76) Inventor: Donald A. Abernathy, 1208 Rapids Rd., New Braunfels, TX (US) 78130

( * ) Notice: Subject to any disclaimer, the term of this patent is extended or adjusted under 35 U.S.C. 154(b) by 686 days.

(21) Appl. No.: 10/894,458

(22) Filed: Jul. 19, 2004

Related U.S. Application Data (60) Provisional application No. 60/488,826, filed on Jul. 21, 2003.

(51) Int. Cl.
*G06K 9/00* (2006.01)

(52) U.S. Cl. .................. 382/108; 701/208; 382/100; 382/254; 382/275; 324/330; 324/323

(58) Field of Classification Search ........ 382/108–113, 382/100; 701/208
See application file for complete search history.

(56) References Cited

U.S. PATENT DOCUMENTS

| | | | |
|---|---|---|---|
| 3,703,133 A | | 11/1972 | Yost |
| 4,853,543 A | | 8/1989 | Ozdemir |
| 4,963,742 A | * | 10/1990 | Abernathy ............... 250/338.5 |
| 5,266,799 A | * | 11/1993 | Steinitz et al. .............. 250/253 |
| 5,557,397 A | * | 9/1996 | Hyde et al. ................. 356/5.01 |
| 5,629,988 A | * | 5/1997 | Burt et al. ................... 382/276 |
| 6,549,012 B2 | | 4/2003 | Stolarczyk |
| 6,774,939 B1 | * | 8/2004 | Peng ........................ 348/231.4 |
| 6,873,265 B2 | * | 3/2005 | Bleier ......................... 340/690 |
| 7,127,348 B2 | * | 10/2006 | Smitherman et al. ........ 701/208 |
| 2004/0119020 A1 | | 6/2004 | Bodkin |
| 2005/0017721 A1 | * | 1/2005 | McCracken et al. ......... 324/330 |

FOREIGN PATENT DOCUMENTS

| WO | WO 02/082181 A1 | 10/2002 |
|---|---|---|
| WO | WO 2004/028134 A2 | 4/2004 |

OTHER PUBLICATIONS

Ann Parker, Bird's Eye View Carlifies Research on the Ground, S&TR May 2003, pp. 12-21, Lawrence Livermore National Laboratory.

* cited by examiner

*Primary Examiner*—Samir Ahmed
*Assistant Examiner*—Eric Rush
(74) *Attorney, Agent, or Firm*—Eric W. Cernyar, P.C.

(57) ABSTRACT

A portable multispectral data acquisition system for use on a vehicle such as an aircraft comprises a plurality of gyroscope-stabilized remote sensing devices synchronized to simultaneously capture images of a common spatial area in both visible and invisible bands of the electromagnetic spectrum, a computer and digital recorder to record and correlate the captured images with temporospatial reference information, image processing software to stack or layer the images and to extract and compare the images in order to identify and filter hidden or subsurface anomalies that are invisible to the naked eye, and additional image processing software to orthorectify the images to a three-dimensional digital terrain map and to stitch adjacent images together into a mosaic. Methods for using the portable multispectral data acquisition system are also provided.

3 Claims, 12 Drawing Sheets

Fig. 11

MULTISPECTRAL DATA ACQUISITION SYSTEM AND METHOD

RELATED APPLICATIONS

This application claims the benefit of, and incorporates by reference, U.S. Provisional Application No. 60/488,826, filed Jul. 21, 2003, and entitled "Multispectral Data Acquisition System."

FIELD OF THE INVENTION

This invention relates to remote sensing systems, and more particularly to remote sensing systems that employ a plurality of sensing devices to detect both surface and subsurface features of a place, region or object.

BACKGROUND

The most familiar system for detecting the surface features of a terrestrial surface or object is the human eye. But there is far more electromagnetic information about an object than meets the eye. It is well known, for example, that all objects having a temperature above absolute zero emit electromagnetic radiation. Hot objects predominantly emit radiation at short wavelengths. Cool objects predominantly emit radiation at longer wavelengths. Objects also absorb and reflect incident electromagnetic radiation. The variation of an object's reflectance with respect to the wavelength of the incident light helps determine what an object looks like. Indeed, different materials and molecular structures emit and reflect electromagnetic energy in different but characteristic ways depending on the temperature of the material or the wavelength of the incident radiation.

There are a variety of commercially available sensors and imagers operable to detect various wavelengths and intensities of electromagnetic energy, both visible and invisible, and both reflected and emitted, emanating from various objects and materials. Employing knowledge about known characteristic energy absorption and radiation patterns for different surface and subsurface materials and molecular structures, it is possible to use information collected from such sensors and imagers to detect and identify surface and subsurface features of a place, region or object that are invisible to or hidden from the naked eye. These hidden or invisible features are commonly referred to as "anomalies."

Surface and subsurface imaging technology has a wide field of applications. Imaging technology can and has been used, for example, to survey fields to search for pipeline leaks. In U.S. Pat. No. 4,963,742, I describe an airborne multispectral survey system comprising up to three infrared detectors and two video cameras. Using standard, commercially available video tape recorders, the system simultaneously captured and recorded images in both the visible region and in selected infrared bands of the electromagnetic spectrum of the terrain below. After the recording, analysis could be performed by simultaneously playing the infrared and video recordings to identify anomalies—areas where the infrared recordings detected temperatures outside of a given threshold and which could not readily be explained from the visible features of the terrain. That system, however, heavily on human observation and on-site inspection of anomalies. Moreover, given the limitations of the system, it was difficult to separate anomalies of interest from "false" anomalies (anomalies not of interest). Therefore, there is a need for more sophisticated multispectral remote sensing systems that facilitate improved anomaly analysis capabilities.

SUMMARY OF THE INVENTION

A data acquisition system is provided comprising a plurality of remote sensing devices. One embodiment of the data acquisition system comprises a wide angle visible-spectrum camera, a narrow-field-of-view visible-spectrum camera, a short infrared wavelength imager, a long infrared wavelength imager, a laser mapping or scanning device, an ultraviolet imager, a broad-band linear sweep laser, a magnetometer, and means for simultaneously recording the information collected. Means are provided for integrating captured frames into a composite image or mosaic; for overlaying and comparing images captured from one imager with corresponding (i.e., simultaneously captured) images from another; and for identifying and distinguishing surface from subsurface anomalies. In one embodiment, the image capture devices are mounted on an aircraft such as a helicopter, together with gyroscopes or other means for stabilizing the instruments during flight and means for simultaneously recording referential data provided by a global positioning satellite system and an inertial reference system. In other embodiments, the image capture devices are hand-held or mounted on terrestrial, sea-borne, or amphibious vehicles.

The primary purpose of the data acquisition system is to acquire information in several different electro-magnetic bands or frequencies simultaneously so that data analysis will allow direct interpretation of effect and reaction of varying radiation levels or norms that prove to be valuable information, not available in any single wave length. The data acquisition system allows visual reference, as well as computer generated interpretive uses, and both real time and recorded analysis and review.

The data acquisition system works by looking for a combination of radiation levels. The resulting images allow a computer application or trained analyst to see and identify varying geometric digital profiles, or signatures, that violate the logical geometric comparable norm patterns. The several different remote sensors of the data acquisition system are trained on a common terrestrial target area, for viewing selected frequency bands of the electromagnetic field. Perspective data acquired by the remote imaging devices are preferably compiled to create what would appear to be a multi-dimensional (or layered) logic array of "stacked" imaging data. Some of this data is reflective energy, while other is radiated energy. Differences that appear between the various images that may be referred to as "anomalies." These anomalies are caused by variations in the reflective and radiated energies in different frequency bands. Often, the variations are foreign effects caused by an influencing generator or absorbent of the natural thermodynamic characteristics in the target area. Anomalies are also caused by changes in the density of target mass.

The data acquisition system is preferably operable to provide information including, but not limited to, changes in the absorption characteristics of sub-surface mass, changes in geological mass radiation caused by fluids or gasses below or above the surface target area, and changes in radiation influences on ground, water or other surface materials. The data acquisition system also preferably provides high speed assessment of the effect and reactions of varying levels of both radiation and reflected energy of the "target" and the effects caused by virtually anything within the radiation target area that would cause an abnormal radiation ambient or average deviation. Thus, a suitable embodiment of a data acquisition system includes the following equipment: a visual spectrum camera of 0.2-0.90 microns with defined color separation; a 3-14 micron infrared imager with varying ranges and the capacity of a variable or "floating raster" of defined increment range that can manually or automatically sweep the ambient range of the target area; an advanced cesium magnetometer array that provides earth magnetic flux data; a specialized laser imaging system combined with a spectrometer that provides profile and other spectrographic information; a time code generator or a GPS signal to ensure that each frame or sector of data is clearly identified; data recorders; broadband color CCD cameras (0.2-0.9 microns); lenses for the cameras; power distribution box and cables; and color monitors for real time data processing and system status monitoring. Other technologically enhanced embodiments of the data acquisition system may also incorporate an ultra-violet imaging system, a high-resolution variable spectrum solenoid, and side scan pulse sonar.

The image analysis process is able to support capture and retention of files that conventional CAD engineering programs can read, thus making the data more usable. The analyst is able to overlay image data onto G.I.S. data. This enables optimal analysis, superior inventorying and precise locating capabilities. Interpretive analysis may be carried out on numerous phenomena ranging from subsurface mass, ground water activity, leachate and pipeline leaks to the density changes in vegetation where drought, disease or photosynthesis problems may exist.

I believe my invention to be useful for a wide range of applications, including detection of water and gas pipeline leaks, mechanical failures in industrial machinery, and electrical insulation damage on utility lines. Other applications include detection of crevasses, road surface delamination, dam and dike seepage points, gas leaks and gas seepage, and subsurface dump sites. The invention is also useful for land use studies and regulatory-mandated environmental surveys. Environmental study applications include vegetation discrimination, urban microclimate studies, airflow effects on vegetation near water bodies, crop moisture studies, animal behavior studies, glacial drift studies, estuarine ecology studies, arctic geology studies, groundwater studies, identification of subterranean streams, hot spring detection, river current studies, thermal effluent discharge detection and mapping, strip mining studies, forest fire detection and mapping, geological mapping, and volcano studies.

These and other aspects, features, advantages, and applications of various embodiments of the present invention will be readily apparent to those skilled in the art from the following detailed description taken in conjunction with the annexed drawing, which illustrate the invention.

DETAILED DESCRIPTION

Figure 1:
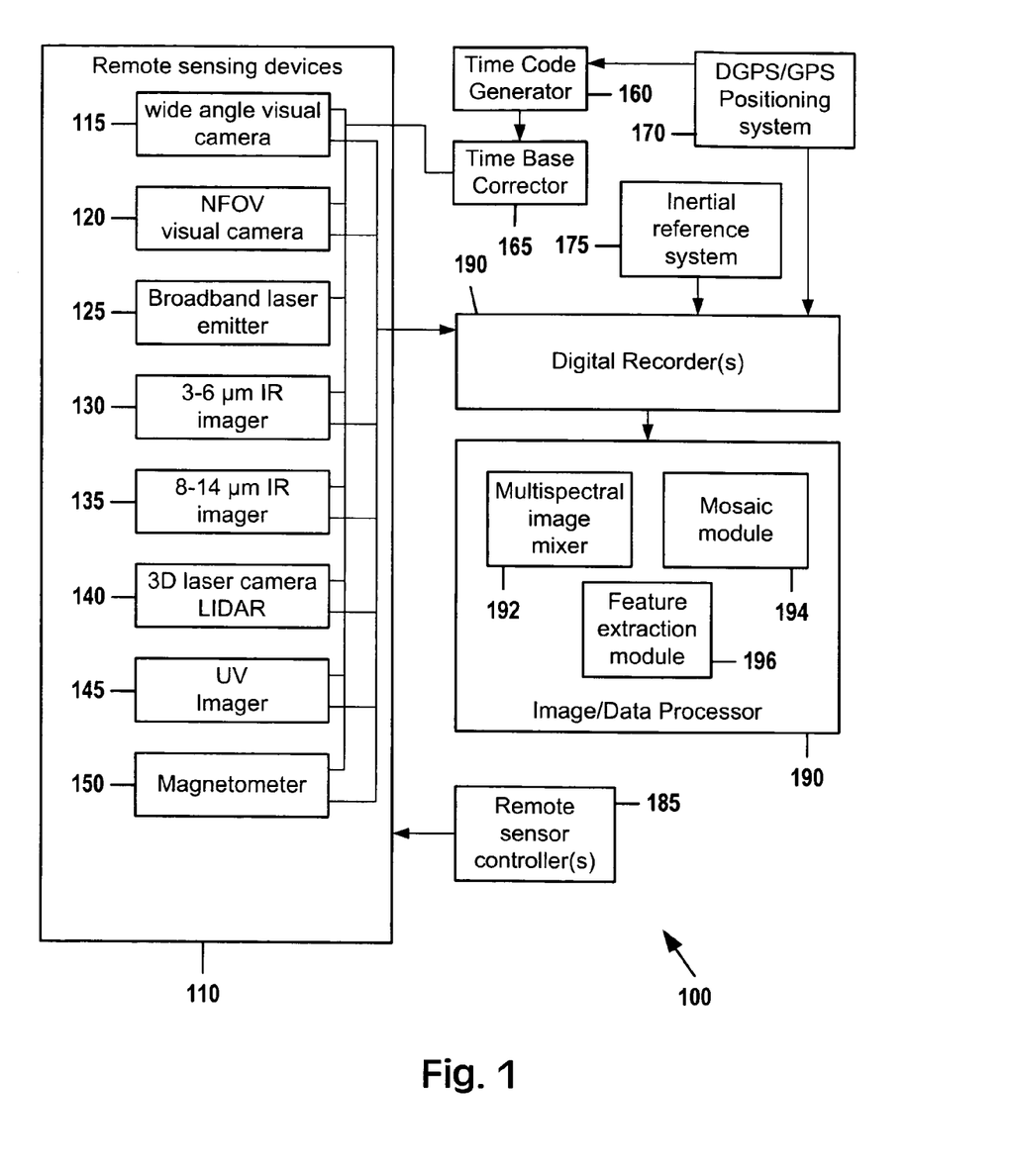
FIG. 1 is a block diagram of one embodiment of a multispectral data acquisition system.

Turning to FIG. 1, an embodiment of a multispectral data acquisition system 100 is provided comprising a plurality of remote sensing devices 110, one or more controllers 185 operable to control the focus, direction, and other operating characteristics of the remote sensing devices 110, an image and data processor 190, and one or more digital recorders 180. The digital recorders 180 comprise any suitable media for digital recording, including but not limited to digital 8 format VCRs, flash memory, optical drives, and standard computer hard drives. The image and data processor 190 comprises one or more computer processors and random access memory for executing software applications that correlate, filter, and process the data recorded on the digital recorders 180. Although the invention is not limited to any one combination of remote sensing devices 110, it preferably includes a plurality of passive and active remote sensing devices, including at least one remote subsurface imaging device.

As shown and depicted in the drawing, the data acquisition system 100 comprises a wide angle visual camera 115, a narrow field-of-vision camera 120, a 3-6 μm mid-range infrared imager 130, an 8-14 μm long-wavelength infrared imager 135, a three-dimensional narrow-band laser range finder or laser mapping device 140, commonly known by the acronym LIDAR (light detection and ranging), an ultraviolet imager 145, magnetometer system 150, and a 3-axis variometer 155. The data acquisition system 100 as shown and depicted in the drawing also comprises a broadband laser emitter 125.

In operation, the remote sensing devices 110 are mounted on an aircraft or other vehicle. The digital recorders 180 and controllers 185 are also preferably carried by the same vehicle carrying the remote sensing devices 110, but with the help of high-bandwidth wireless communication link, could be housed or mounted elsewhere. The image and data processor 190 or some portion of it may also carried by the same vehicle carrying the sensing devices 110 and digital recorders 180 and in real-time communication with the same. Alternatively, the image and data processor 190 or some portion of it is housed or mounted elsewhere, such as a ground-based data processing facility.

Figure 2:
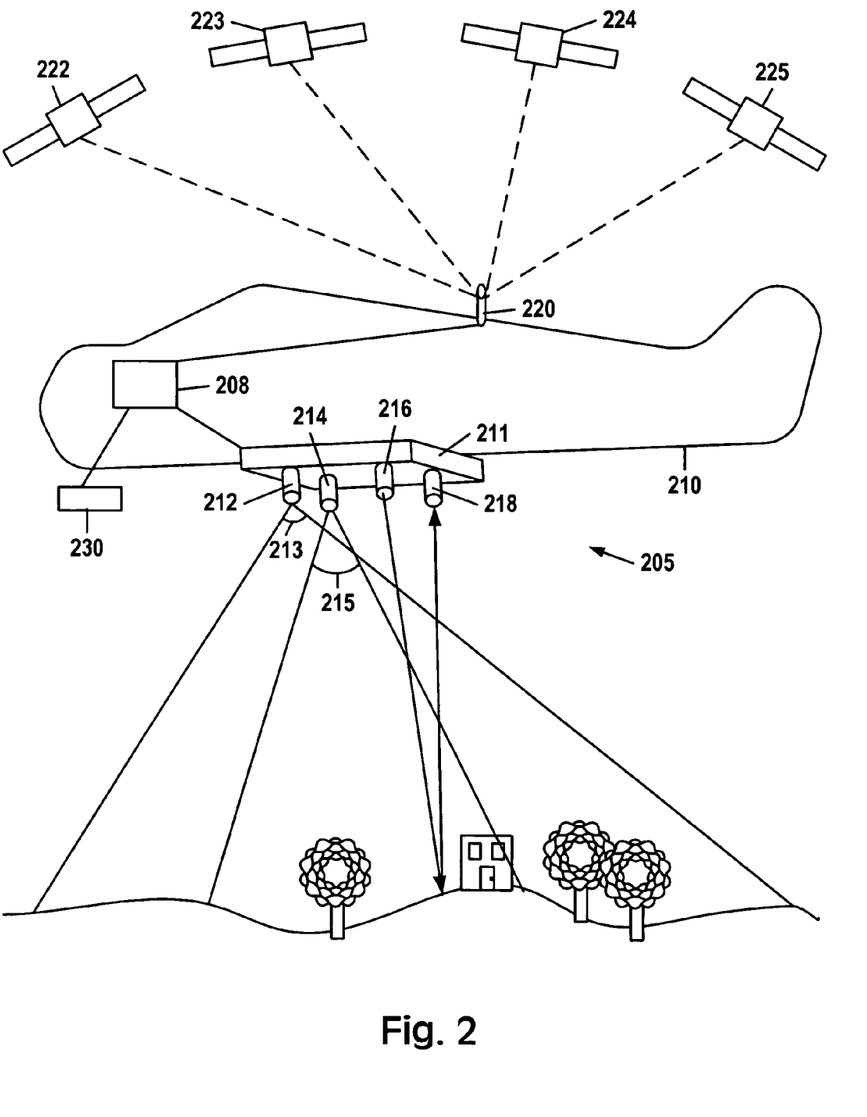
FIG. 2 illustrates an aircraft equipped with another embodiment of a multispectral data acquisition system.

FIG. 2 illustrates an aircraft 210 equipped with an embodiment of a multispectral data acquisition system 205. GPS antenna 220 receives GPS positioning data from GPS satellites 222-225 and transfers the information to an onboard computer 208. An inertial reference system 230 is communicatively coupled to the computer 208 so that it can record the roll, pitch, and heading of the aircraft and determine the orientation of the aircraft 210. A gyroscope-stabilized platform 211 for carrying remote sensors is mounted to the aircraft 210. The platform 211 carries a first visible-spectrum camera 212 having a wide angle field of view 213 and a second infrared-spectrum camera 214 having a narrow field of view 215. The objective focal axis (not shown in FIG. 2 but corresponding to the direction to which the sensor is directed) of the first camera 212 is substantially parallel to the second camera 214, so that the two cameras are trained on the same target.

The platform 211 (or another like it) also carries a laser emitter 216 and a laser receiver/detector to 218 scan the surface of the terrain below to record elevation data. This laser emitter and detector pair may comprise a standard range-finding LIDAR, a differential absorption LIDAR (DIAL) (which compares absorbed wavelengths with reflected wavelengths to identify molecules with particular spectrographic signatures), a Doppler LIDAR (to measure the velocity of a target), or a device that combines the capabilities of all three. In pipeline applications, the laser emitter and detector pair is preferably tuned to an infrared, most preferably the near infrared, frequency or range of frequencies to facilitate detection of pipeline leaks and the size of the flume.

Figure 3:
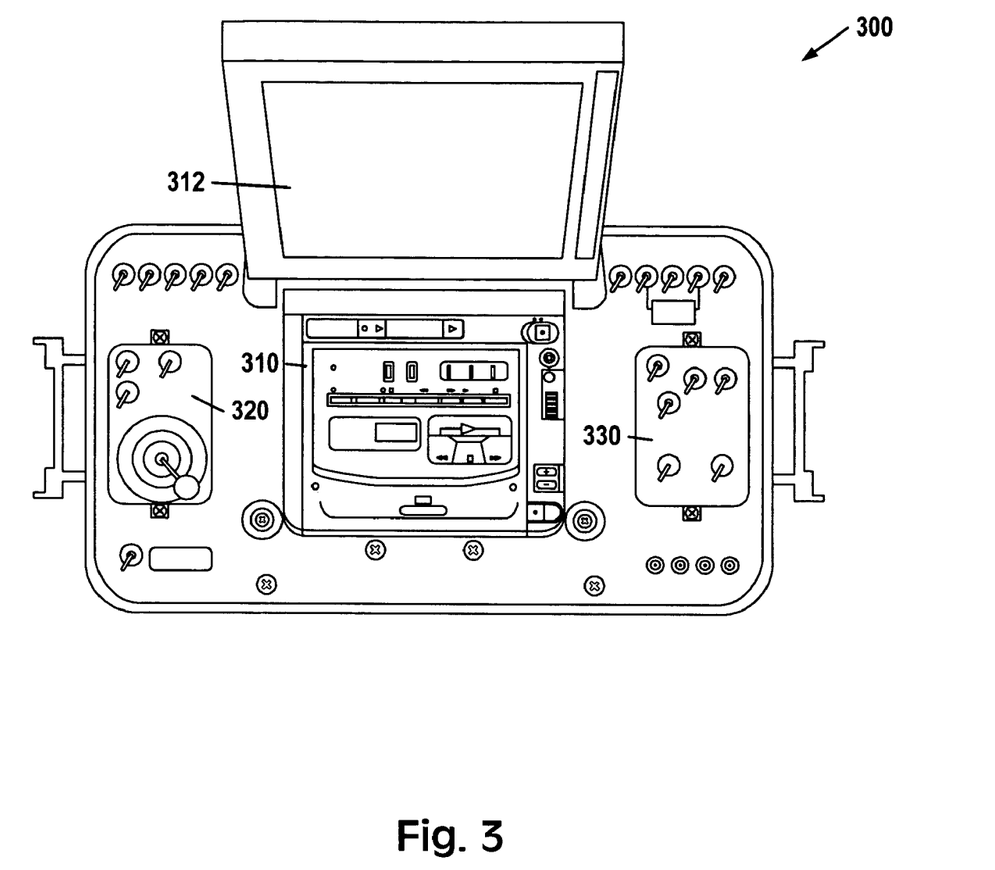
FIG. 3 illustrates a top level view of an on-board computer and controller for a portable multispectral data acquisition system.

FIG. 3 illustrates a top level view of an on-board computer and controller 300 for a portable multispectral data acquisition system. The controller 300 has a digital data recorder 310 to record images received from its imagers and detectors together with temporospatial information received from the GPS satellites 222-225 and inertial reference system 230. The digital data recorder 310 can also record verbal information spoken by the person operating the system (e.g., the pilot or an on-board technician) while the images are being recorded. A video screen 312 on the controller enables an operator of the system to view images received from one or more of the sensing devices in real time.

The controller also has a motion control interface 320 with switches, knobs, and a joystick to control the sensitivity of the gyros and the speed of the servos and to actuate the servos that control the orientation of the sensing devices carried by the platform 211. The onboard controller 300 also includes a camera setting control interface 330 to control various settings of the remote sensing devices carried on the platform 211. Such settings include the digital and optical zoom (or field of view) settings, the camera focus, and, for any IR cameras, the emissivity setting. Other optional adjustable settings (not shown in FIG. 3) include the ranging and power levels for the LIDAR system and any magnetometers and the frequency levels of any scanners and oscillators.

Figure 4:
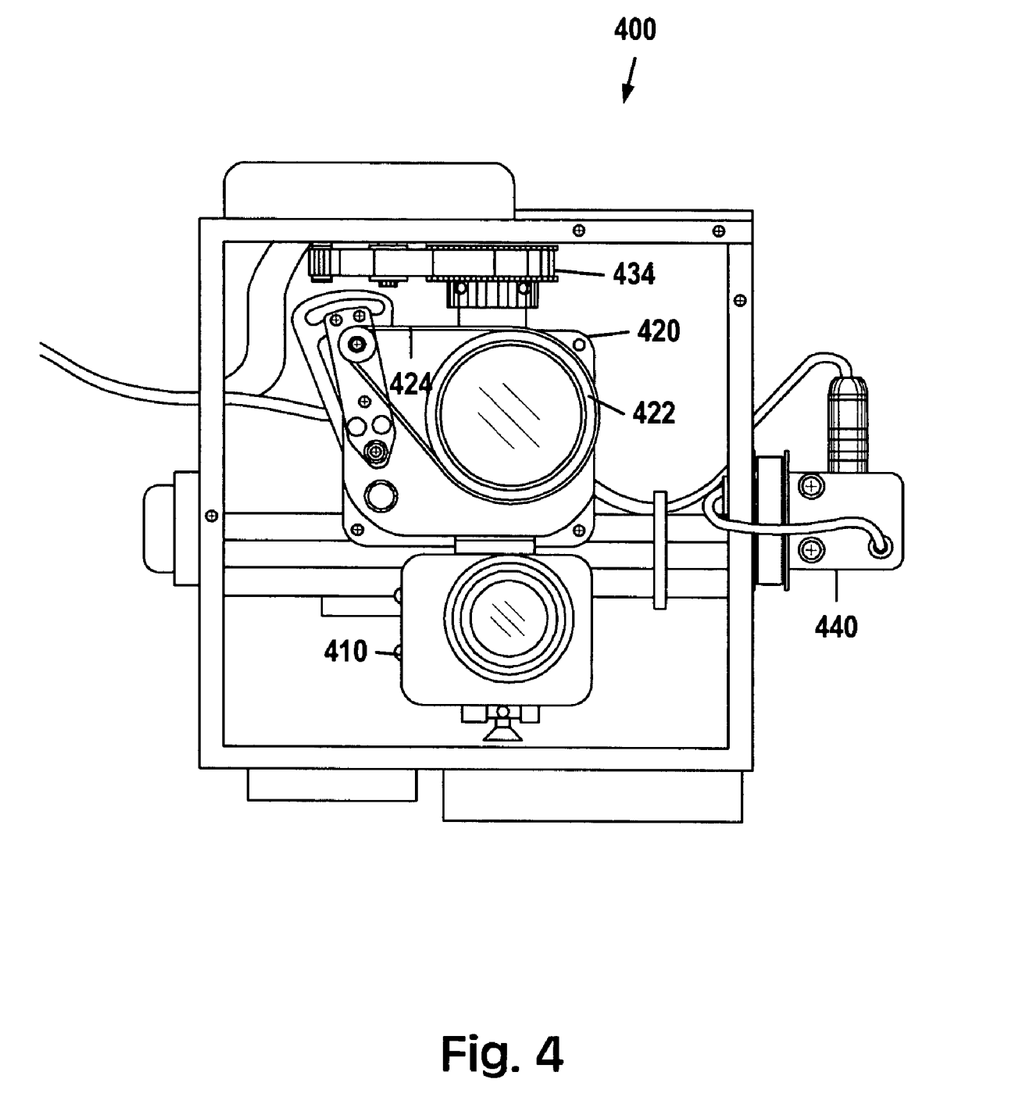
FIG. 4 is a view of one embodiment of an aircraft-mounted platform for carrying two cameras.

FIG. 4 is a view of one embodiment of the platform 211 for carrying two cameras 410 and 420, which for purposes of FIG. 4, is referred to as a camera pack 400. Camera pack 400 comprises a gyroscope stabilized aircraft mount 440 and cameras 410 and 420. The camera pack 400 includes a variety of servos that are used to both adjust the position of the cameras 410 and 420 and to adjust various settings of those cameras. For example, one servo controls a pulley 424 and adjusts the focus of the lens 422. Another servo turns a pulley 434 to adjust the camera angle (i.e., the angle of the camera's objective focal axis).

Figure 5:
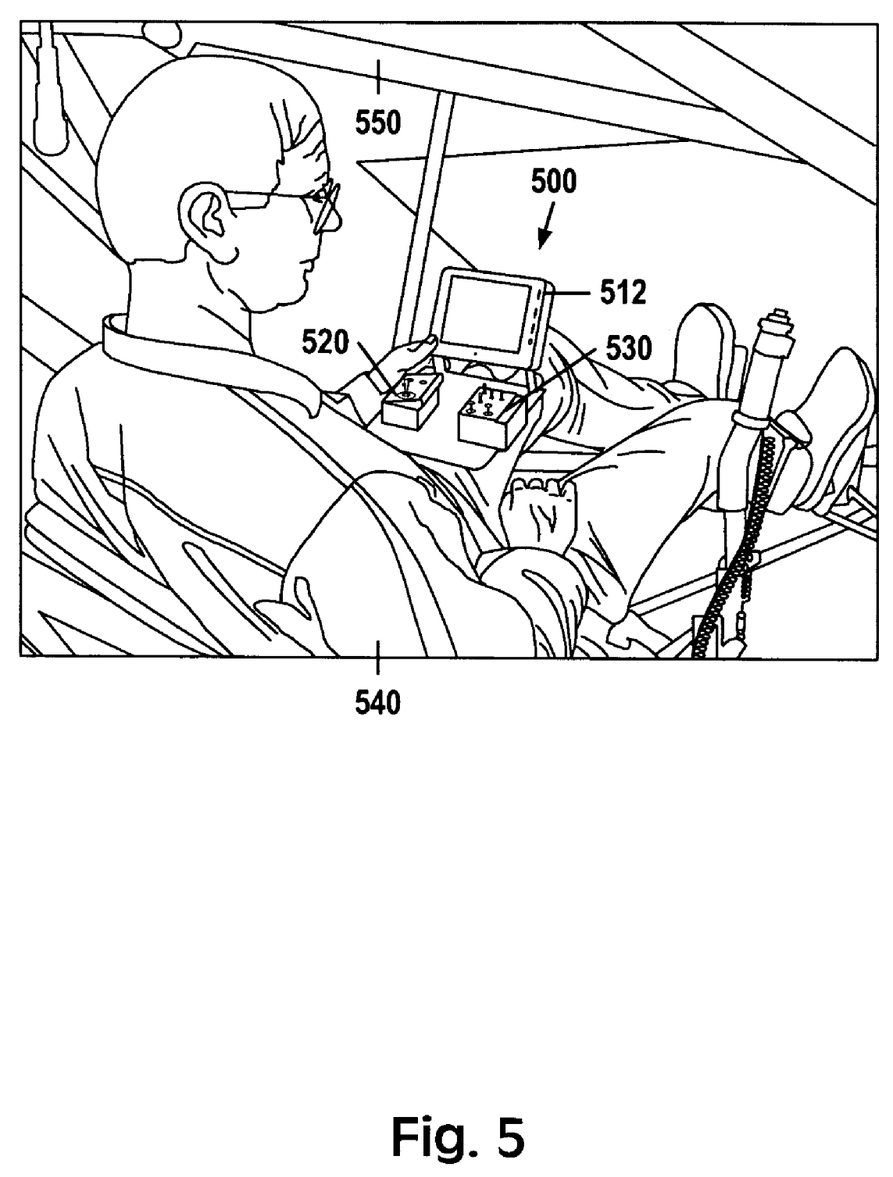
FIG. 5 illustrates a small hand held controller being held by a person in an ultra-light aircraft equipped with a multispectral data acquisition system.

FIG. 5 illustrates a small hand held controller 500 being held by a person in an ultra-light aircraft 550 equipped with a multispectral data acquisition system. This hand held controller 500 includes a video screen 312, a camera motion control interface 520 and a camera setting control interface 530. The small hand held controller 500 enables an operator to adjust remote sensing device settings (such as the emissivity setting of an IR camera) in real time as multispectral videos are being captured.

A suitable data acquisition system 100 preferably utilizes several mass-produced, "off-the-shelf" components, because they tend to be more light-weight, compact, and economical than custom-made components. For example, a suitable camera 115 or 120 comprises a broadband color CCD block camera made by Sony® under the product designation "FCB-EX780SP." This particular camera is operable to capture wavelengths from between about 0.2 and about 0.9 µm in length, i.e., the visible spectrum and the near infrared and near ultraviolet portions of the spectrum. Because this particular camera extends into the near ultraviolet portion of the spectrum, it is also suitable, if chilled and combined with a filter, to function as the ultraviolet imager 145. For example, a 0.24-0.28 µm wavelength pass-through filter would enable the camera to capture images of high-voltage coronas on electric distribution lines and components.

A suitable infrared imager 130 is sold under the trademark ThermoVision Ranger™ by Flir Systems, Inc.™ of Portland Oreg. This particular imager 130 has a 3-5 µm near infrared spectral range. A suitable infrared imager 135 is sold under the trademark ThermoVision 2000™ by Flir Systems, Inc. This particular long-range, platform mounted imager has an 8-9 µm far infrared spectral range.

The data acquisition system 100 obtains valuable 3-dimensional information about the topography of a surface through its laser ranger finder 140. A suitable laser range finder 140 is sold by Optech™ of Toronto, Canada, under the product designation "ALTM 30/70". The laser range finder 140 is used to obtain detailed and accurate elevation or depth information about a topographic surface.

The data acquisition system 100 obtains important subsurface information through its magnetometer system 150. A magnetometer is an instrument for measuring the variations in the magnitude and direction of a magnetic field, and in particular, variations in the earth's magnetic field. Surface and subsurface features such as a buried pipeline can distort the earth's magnetic field in ways that can be remotely sensed with a handheld or aircraft-mounted magnetometer. A suitable magnetometer 150 comprises a cesium magnetometer sensor and electronics package is sold by Geometrics™ of San Jose, Calif., under the product designation "G-822A".

In a preferred embodiment, an array of at least two of these cesium magnetometers are adjustably mounted on one or more booms attached to a helicopter or ultralight aircraft at a distance of about 40 feet apart. At this distance, two linear data streams can be acquired during a flyover of a pipeline, eliminating the need, in some applications (especially pipeline applications), to make parallel flight lines over the surveyed area. The magnetometers are adjustably mounted to maintain the sensors' equators and long axes at angles of at least 6 degrees away from the earth's field vector.

During operation, magnetic field data is acquired from both magnetometers simultaneously at an above-ground altitude of up to 30,000 feet, but most preferably at about 500 to 2,000 feet. The absolute magnetometer data of the two magnetometers are compared to determine the lateral horizontal gradient between the two magnetometers. The magnetometer data is then used to generate a magnetometer survey map of the terrestrial surface. In pipeline survey applications, the magnetometer data is used to detect cathodic breakdown of the pipes.

It is expected and anticipated that many other "off-the-shelf" components exist or will become available with advances in technology that would also be suitable for the data acquisition system 100 described herein and possibly superior to the components described herein. Therefore, it will be understood that the invention disclosed in this application is by no means limited to the specific "off-the-shelf" components noted herein.

As shown and depicted in FIG. 1, the data acquisition system 100 also comprises a broadband laser emitter 125 utilizing a light source having a range of wavelengths from 0.1 to 18 microns. A light source passes through a very precise prism mounted on a piezo-ceramic wafer that vibrates at frequencies of up to 1 GHz, providing a linear sweep of wavelengths, which can be time-calibrated, that are emitted by the laser emitter 125. The other remote sensing devices 110 may be utilized to detect reflected laser light originating from the broadband laser emitter 125. In this manner, the remote sensing devices 110 can function as both passive and active remote sensors.

In alternative embodiments, the broadband laser emitter can be used in place of a conventional laser range finder to generate a three-dimensional topographical map of a surface. Because control of the piezo-ceramic wafer can be used to precisely alter the direction of the laser beam of the broadband laser emitter 125, there is no need to pulse the laser light source, as is done with conventional laser range finders.

Airborne-based embodiments of the data acquisition system 100 preferably include means for mounting the remote sensing devices 110 on the aircraft and means for stabilizing the remote sensing devices 110 during flight. A suitable gyroscope-stabilized aircraft mount for the remote sensing devices 110 is marketed by K-Hill, Inc., of Fort Worth Tex. under the Sky Pack™ trademark.

The data acquisition system 100 also comprises a time code generator 160 and time base corrector 165 to synchronize the remote sensing devices 110. Airborne-based embodiments of the data acquisition system 100 preferably also include a global positioning satellite (GPS) receiver 170 to provide information about the precise location of the aircraft. In these embodiments, the GPS data also serves as an input to the time code generator 160. Airborne-based embodiments of the data acquisition system 100 also preferably include an inertial reference system 175 to record the roll, pitch and heading of the aircraft to determine its orientation in space. Input from the GPS receiver 170 and inertial reference system 175 enables the image and data processor 190 to correlate spatial reference information with the frames and/or data streams captured by the remote sensing devices 110.

One embodiment of the image and data processor 190 takes the form of a standard, commercially available computer, in combination with one or more image processing video boards plugged into a hardware slot of the computer. The image and data processor 190 preferably includes a multispectral image mixer module 192 operable to stack images captured from the different remote sensing devices 110. The image and data processor 190 also preferably includes a module or application 194 operable to automatically orthorectify and integrate topographical images into a composite image or mosaic. A preferred process of orthorectification is described further below. A suitable orthorectification and mosaic module or application 194 is sold under the trademark ER Mapper™ by the Earth Resource Mapping company of San Diego, Calif.

The image and data processor 190 also preferably includes a feature extraction module or application 196 operable to identify geometric features or profiles in the captured images. Suitable techniques for filtering the images to find anomalies include contrast enhancement, edge detection, two-dimensional fast Fourier transformations and inverse Fourier transformations, image averaging, and de-interlacing to remove field-to-field jitter. The purpose of the filtering is to reduce noise and draw out hidden details contained in the images to improve anomaly detection. A filtering technique suitable for one terrain, such as a lush green field, many not be suitable for a different terrain, such as an arid terrain.

The feature extraction module 196 should also be operable to comparatively analyze the geometric profile of an image captured in one frequency or wavelength (e.g., the infrared spectrum) with the geometric profile of an image captured in any of the other frequency or wavelength (e.g., the visible spectrum), detect differences between the geometric profiles of the various spectrum-specific images, analyze those differences in reference to a rule-based filter or framework (e.g., a set of thresholds), and tag or track those geometric profiles that survive the filtering process of the rule-based framework. In this manner, the feature extraction module 196 is operable to identify features or geometric profiles that are detectable in one or more spectrums but invisible in one or more other spectrums. In this manner, the feature extraction module 196 can also be tuned to identify very specific anomalies.

The data acquisition system 100 optionally also includes land or marine based data acquisition modules, such as an electrical conductivity (or resistivity) imaging device to measure terrestrial resistance to current flow. It is known, for example, that areas that are moist or compacted are more conductive than areas that are dry, less compacted, or which contain voids.

In general, the multispectral data acquisition system of the present invention is designed for high-speed recording and analysis of data from several frequencies of the electromagnetic spectrum. The remote sensors are preferably mounted on an aircraft such as a helicopter or ultralight aircraft. Alternatively, the remote sensors may be manually carried or mounted on a terrestrial, marine, or amphibious vehicle.

Figure 9:
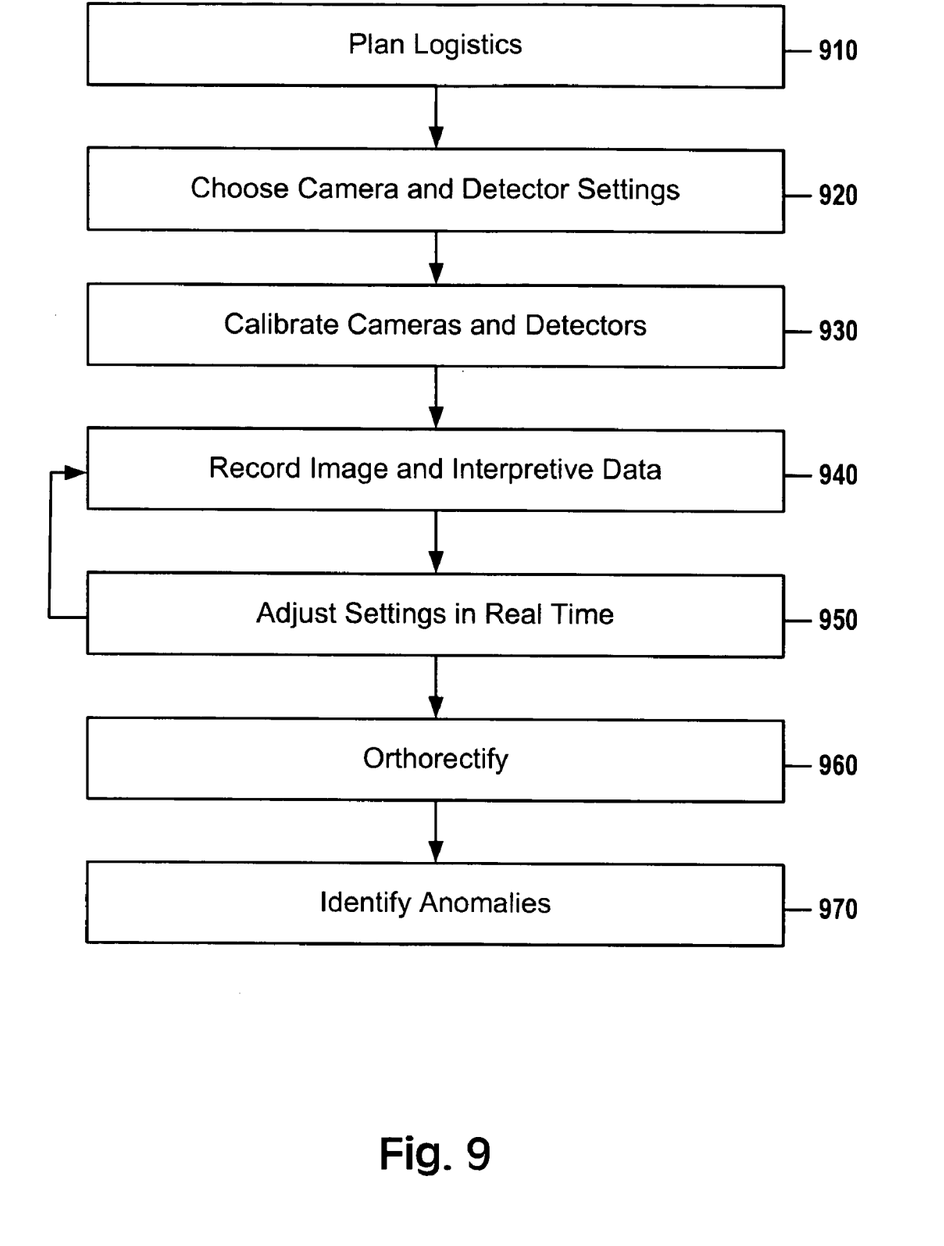
FIG. 9 is a functional block diagram of one embodiment of a method of operating a multispectral data acquisition system.

FIG. 9 illustrates one embodiment of a method of operating the data acquisition system. In step 910 logistical planning is performed. One of the most important aspects of any given job is logistical planning. This involves determining the scope and location parameters of the job because all calibrations and timing issues are likely to be affected or based upon this information.

For some applications it is important to select a time window for data acquisition that minimizes shadow differential signatures, moisture and humidity variances, temperature variances, and the like. The selected time window should also take into account the fact that radiation reflectance and emission characteristics of objects on the surveyed terrain may vary at different times of the day and may affect the quality of the data acquired. Furthermore, it is desirable to select flight times that coincide with observation windows during which GPS satellites will provide the most reliable, error-minimized temporospatial information.

Before performing the data acquisition, it is also desirable to have geological and botanical information of the target area. This information can often be determined by viewing a USGS digital terrain or elevation model or existing satellite and aerial imagery of that area.

In step 920, the remote sensing devices (cameras and detectors) are calibrated and adjusted to optimize the sensitivity of the devices to one or more targeted phenomena. For example, the emissivity setting of any IR imagers are adjusted to facilitate detection of the targeted phenomena. IR cameras with a floating raster are also calibrated or adjusted to target a specific radiation window of interest, so that the thermal characteristics of infrared imaged objects following outside this window of interest will appear saturated. Under Wein's Displacement Law, black body terrain objects which have temperatures ranging from −40 F to +150 F (the range of natural landscape temperatures) have peak emissions from 8.6 to 12.4. Therefore, optic systems and detectors are matched for maximum sensitivity in this region in order to achieve significant terrain component differentiation.

The spectral windows of one or more sensing devices (or of the laser emitter of a LIDAR system) are also tuned or filtered as needed to capture a targeted range of electromagnetic phenomena. The sensing device's fields of view, exposure time, and gain levels are also adjusted as needed. The ranging and power levels of the laser and magnetometers and the frequencies of scanners and oscillators are also adjusted as needed.

In step 930, the sensing devices are time calibrated. It is desirable to relate all of the data tracks to a single coordinated specific time interval. The cameras mounted on the data acquisition system should capture image frames simultaneously. A digital time code generator furnishes regular time signals (60 per second) to logic and data control modules which record the signals on the recording apparatus, thus providing a common frame of reference. Alternatively, time code excitation is done using the GPS signals as the excitation source for timing.

In step 940, a flight is taken and images are acquired using the data acquisition system. In the operation of an airborne-based embodiment of a data acquisition system, an aircraft is flown at a constant altitude above sea level over the area to be surveyed. The sensing devices of the data acquisition system are directed at the area and synchronized recordings are made of the signals from these devices. The airborne portion of the data acquisition system is carried in the cargo area of the aircraft with the equipment operator operating it by remote control.

The data acquisition system preferably captures, records and relates the following data during flight: images and data from each of the sensing devices and camera, a time code, GPS three-dimensional spatial data and inertial reference system data (such as speed and direction) for the aircraft, and the height above ground/target area data using a radar altimeter or laser altimeter. The data acquisition system also optionally records camera setting data (such as the focal or field of view data for one or more cameras) in order to facilitate an automated orthorectification process.

During the data acquisition process, the operator (e.g., the pilot, navigator, or technician) pass over the target area and verbally document landmark characteristics and other information onto the data stream. The data acquisition system records an audio of such remarks along with the sensing device data, longitudinal and latitude data (in minutes and seconds) of the aircraft or image target, and other interpretive data. These activities facilitate accuracy.

In step 950, the operator views the image data and adjusts settings for the remote sensing devices in real time. The operator is desirably trained to make the proper kinds of adjustments in order to more sensitively capture the target data.

In step 960 the image data is orthorectified. The process of orthorectification 930, which can take many different forms, can be carried out in either two or three dimensions and is explored further below in conjunction with FIG. 10.

In step 970 images from different electromagnetic spectra are integrated and co-processed to identify and interpret anomalies. This process, which may also take many different forms, is explained further below in conjunction with FIG. 11.

Figure 10:
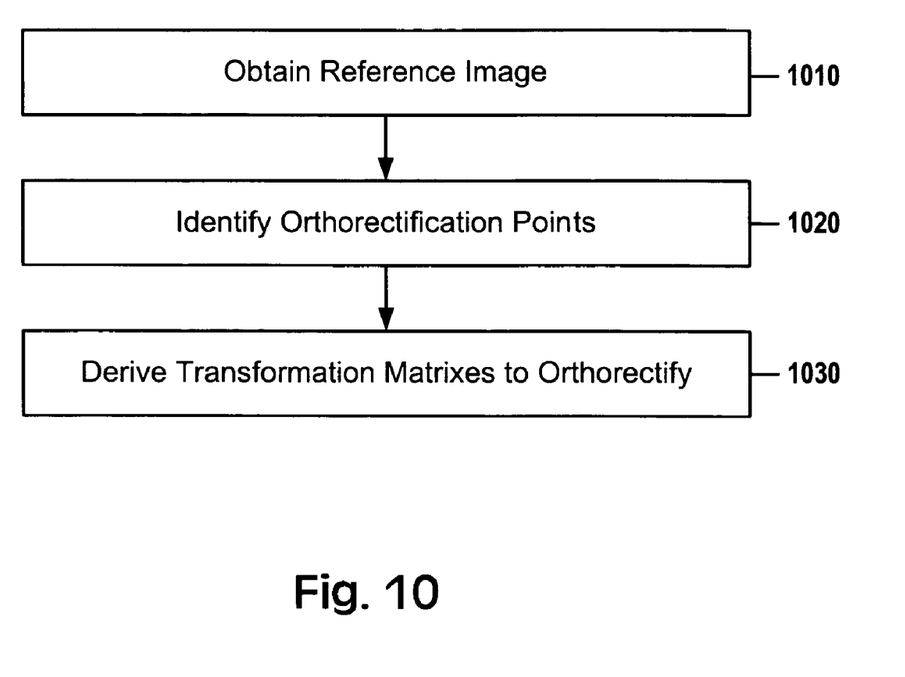
FIG. 10 is a functional block diagram of one embodiment of a method of orthorectifying and layering images captured with a multispectral data acquisition system.

FIG. 10 is a functional block diagram of one method of spatially coordinating or orthorectifying the visual image data. Orthorectification is performed to remove geometric distortions introduced by imperfect camera lens, such as spherical distortions from using a lens with a short focal length. The aim of the orthorectification process is to make any two overlapping pixels of two "overlapping" captured image frames to represent the same piece of terrain. When completed, the orthorectified image data facilitates automatic computerized anomaly identification through comparative pixel-by-pixel analysis of the images.

Figure 6:
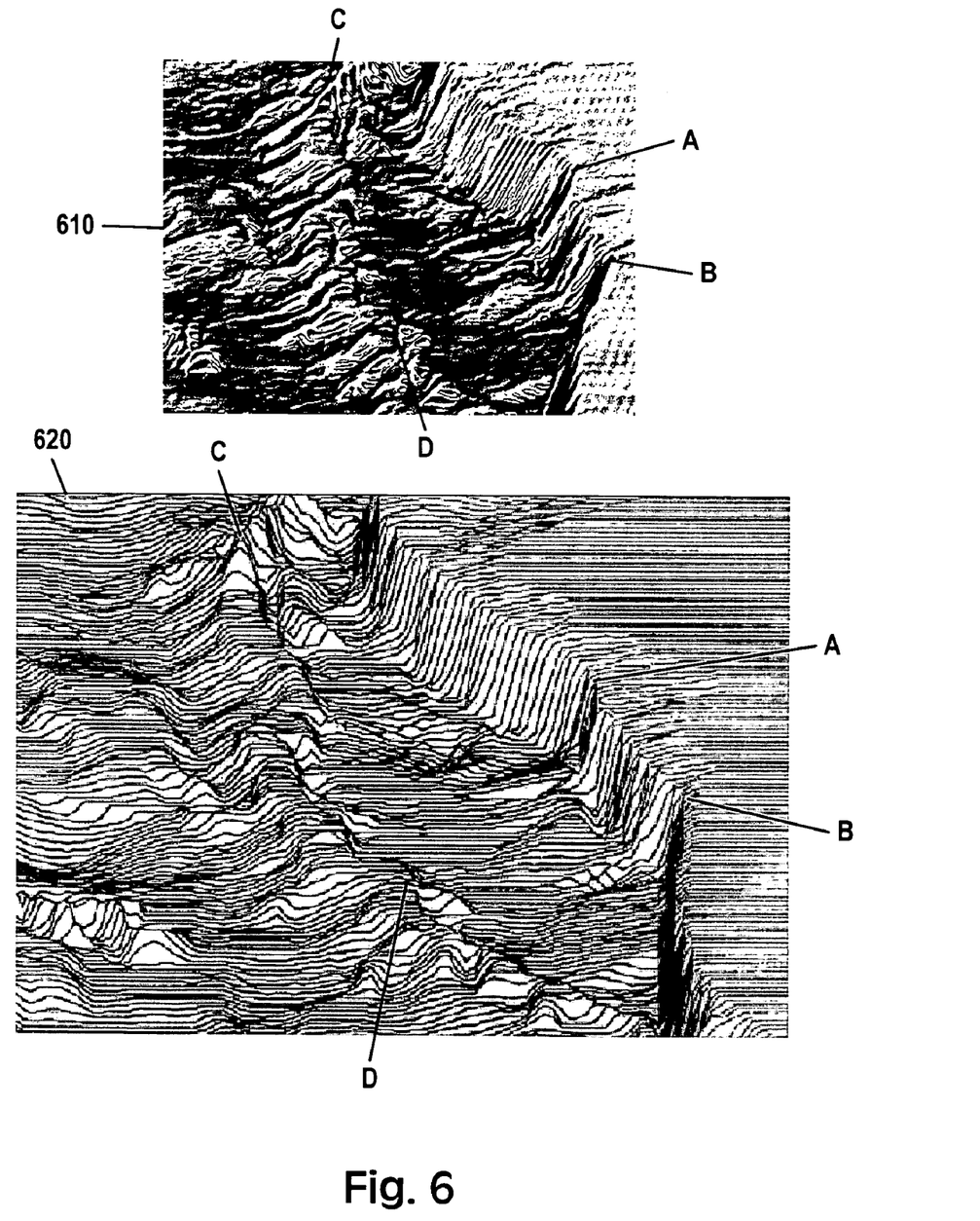
FIG. 6 is a scanned image depicting a plurality of corresponding orthorectification points on a pre-orthorectified image and a topographic map to which the pre-orthorectified image is to be fitted.

As illustrated by step 1010, the process of orthorectification begins with the identification or selection of a reference image. Then, in step 1020, matching landmarks visible in both the captured and reference images are identified. Preferably at least ten corresponding orthorectification points on the captured and reference images are identified. For illustration, FIG. 6 depicts a plurality of corresponding orthorectification points (by the letters A, B, C, and D) on a pre-orthorectified image 610 and a topographic map 620 chosen as a reference image to which the image 610 is to be fitted. The process of identifying corresponding orthorectification points can be done manually or automatically using computer-executed geometric profile recognition algorithms. This process is facilitated if the reference image obtained comes pre-populated with orthorectification points or other data (e.g., highway data) from which orthorectification points (e.g., intersections) can easily be identified or algorithmically extracted.

Figure 7:
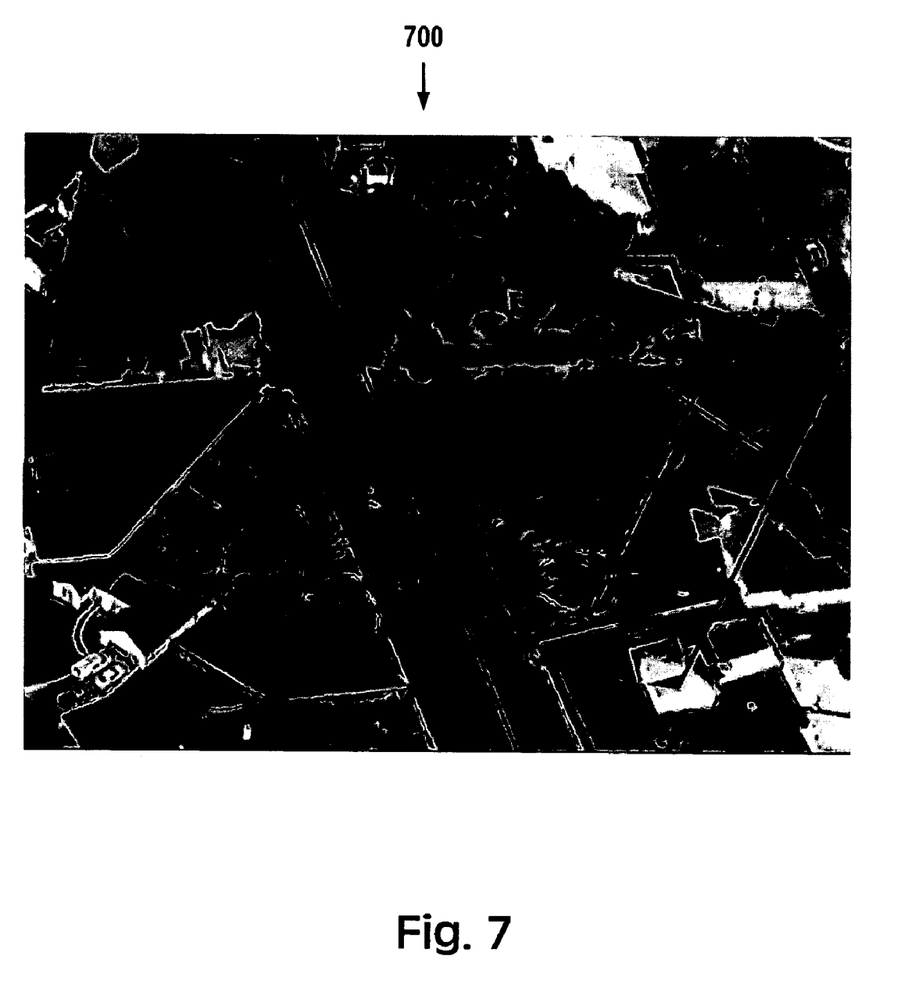
FIG. 7 is a scanned image illustrating an infrared image that has been orthorectified to fit over a visible image slice.

In step 1030, computer executed algorithms derive various mathematical transformation matrixes, that when multiplied by the captured image data, effectively rotate, stretch and bend the captured image until its identified landmarks perfectly align with the corresponding landmarks identified in the reference image. Once orthorectified, the captured image spatially matches with and can be overlaid onto the reference image. FIG. 7 illustrates an infrared image that has been orthorectified to fit over a visible image slice.

Orthorectification is sometimes narrowly understood as a mathematical process of removing the distortion caused by relief and the camera within a photograph so that the scale is uniform throughout the output image. In this sense, the process of orthorectification scales and aligns the image to a specified geodetic coordinate system. In some embodiments of the present invention, orthorectification is performed to a geodetic coordinate system. USGS topographical data may be used as a reference image source and the captured images orthorectified to that topographical data. In these embodiments, the reference image selected in step 1010 comprises a three dimensional topographical map such as a USGS GIS digital terrain or elevation model. In these embodiments, the process of orthorectification permits the captured and now georeferenced images to inherit the elevation data of the topographical map. In these embodiments, each georeferenced orthorectified image slice is preferably stored as a separate layer from the survey map data, and the georeferenced orthorectified images may then be rotated and viewed in three dimensions.

But in other embodiments, orthorectification need not be performed to scale and align the captured images to a specified geodetic coordinate system. Instead, the reference image selected in step 1010 may comprise one of the captured images. The remaining remote sensing image data are orthorectified to the selected reference image.

An advantage of this alternative, non-geodetic orthorectification is automation. A technician may be employed to identify the common orthorectification points between multispectral images of a first set of simultaneously-captured frames. Software is then used to derive the transformation matrixes needed to orthorectify each of the images to the chosen reference image. Because all of the cameras are mounted on a common platform and run synchronously, this manual orthorectification-point-identification process need only be done once, with the first set of frames, provided that the cameras remain fixed relative to each other and no changes are applied to the field of view (such as applying zoom) to any of the cameras. The transformation matrixes derived to orthorectify the first set of overlapping image frames may and are preferably reused, in automated fashion, to orthorectify subsequent frame sets.

Another method of orthorectification (not illustrated) is to use the recorded GPS spatial reference data, the recorded field of view data for the camera that took the image, and any recorded altimeter data to geometrically calculate the spatial position of the center of the image at the ground and the spatial extent of the boundaries of the captured image. This information can be used to either calculate the amount of stretching, skew, and rotation needed to authomatically orthorectify the image to two dimensions, or to facilitate identification of corresponding topographical map data (including corresponding orthorectification points). Yet another method of orthorectification (not illustrated) is to use an image manipulation algorithm to incrementally rotate, skew, filter and refilter the image data and compare it with the topographical map until it finds a good match.

Figure 8A:
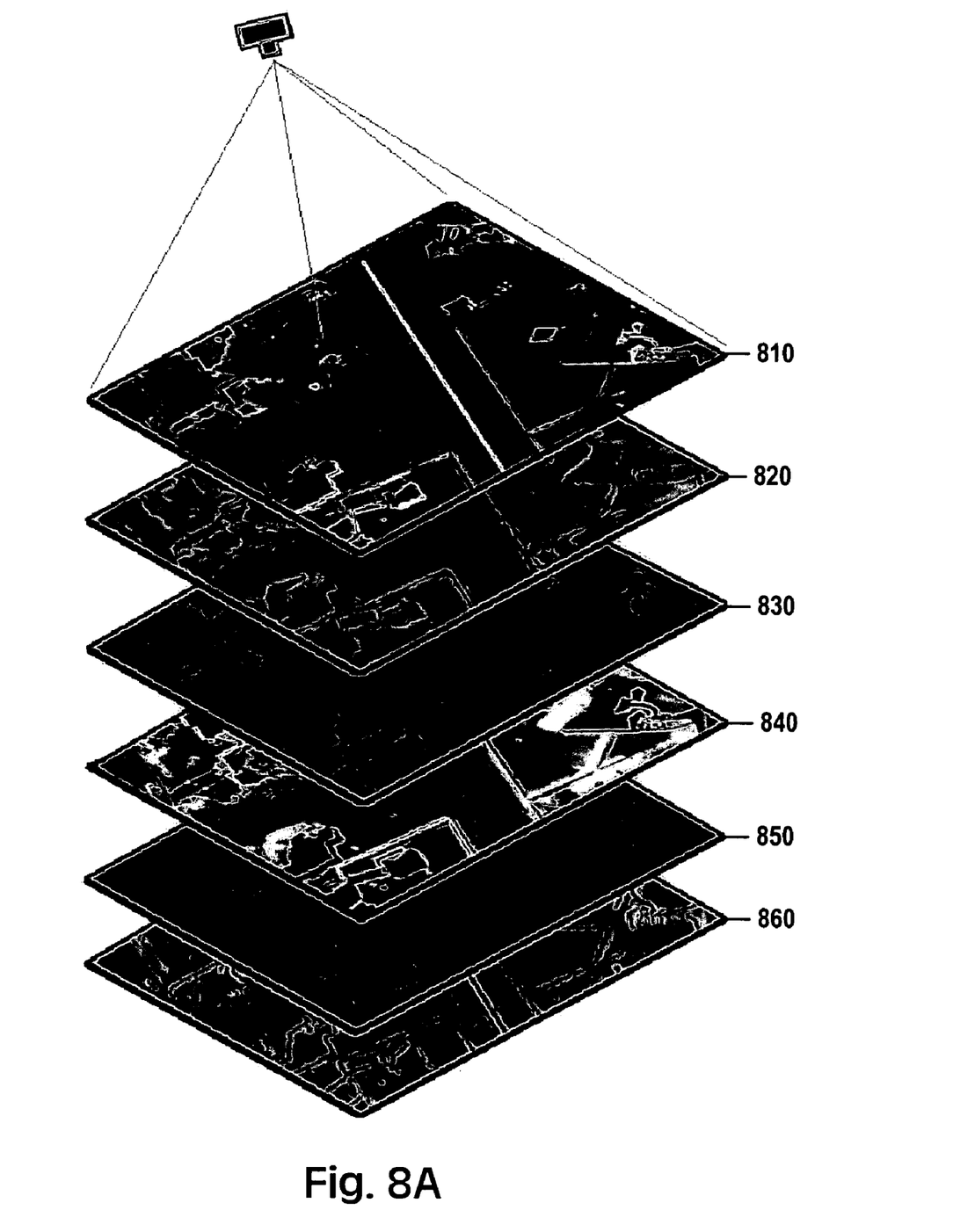
FIG. 8A is a scanned image of a series of logically stacked spatially calibrated image slices simultaneously captured from different remote sensing devices.
Figure 8B:
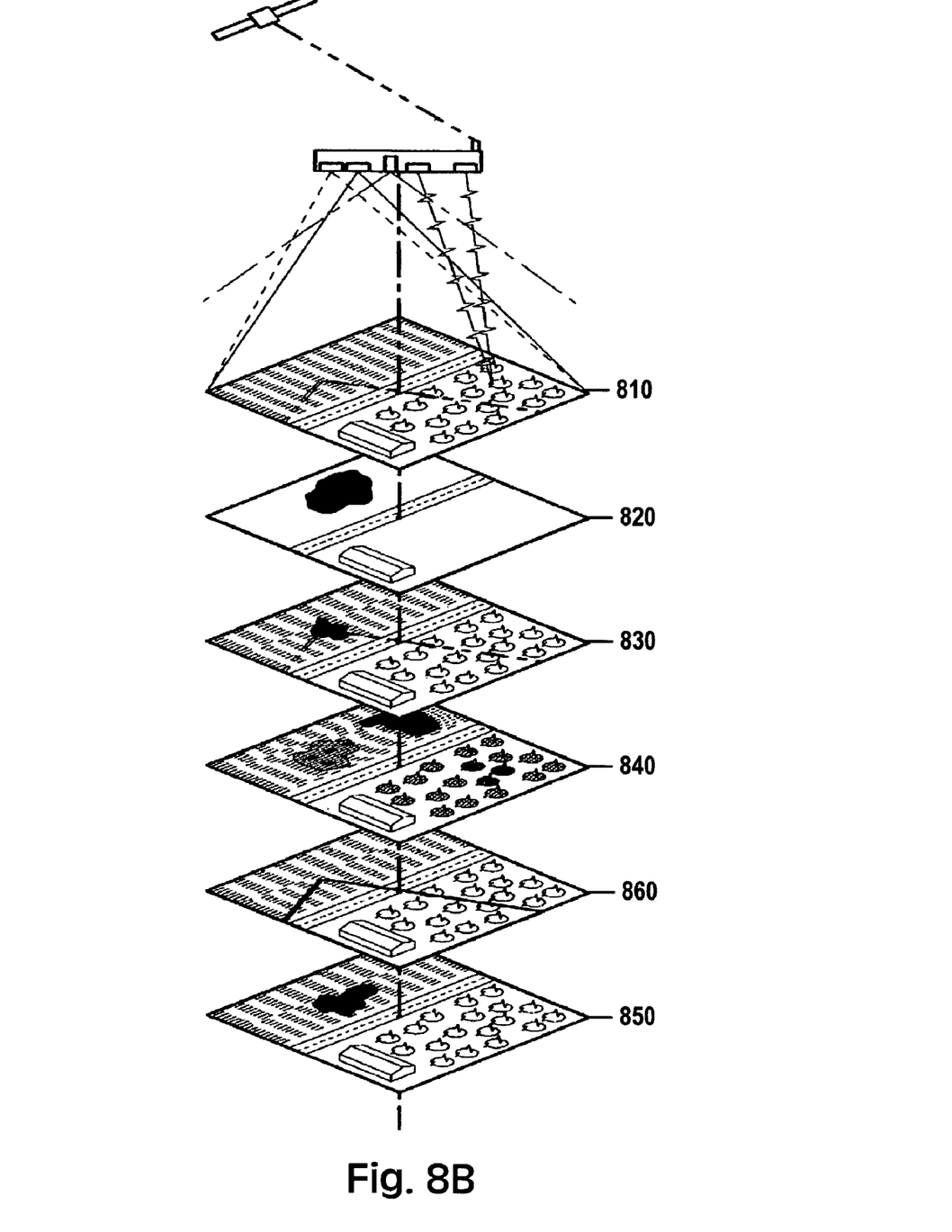
FIG. 8B is a line drawing illustrating a series of logically stacked spatially calibrated image slices simultaneously captured from different remote sensing devices.

FIGS. 8A and 8B illustrate a series of logically stacked orthorectified image slices simultaneously captured from different remote sensing devices. An orthorectified visible light spectrum image 810 illustrates what the human eye would see of the surveyed terrain. A spatially-corresponding orthorectified low-band infrared image 820 illustrates radiation data for the surveyed terrain. The image 820 may also illustrate reflectivity and absorption data from a LIDAR system. A spatially-corresponding orthorectified high-band infrared image 830 illustrates radiation and density data for the surveyed terrain. A spatially-corresponding orthorectified ultraviolet band image 840 reveals the extent and health of photosynthesis taking place in plant life below. A spatially-corresponding orthorectified three-dimensional laser ranging image 850 provides positional and three-dimensional data for the surveyed terrain. A spatially-corresponding orthorectified magnetic data survey slice 860 is useful for identifying ferrous objects and geo-magnetic data in the surveyed terrain. Most or all of these orthorectified image slices can be three-dimensionally rotated and comparatively filtered and analyzed to identify anomalies.

Figure 11:
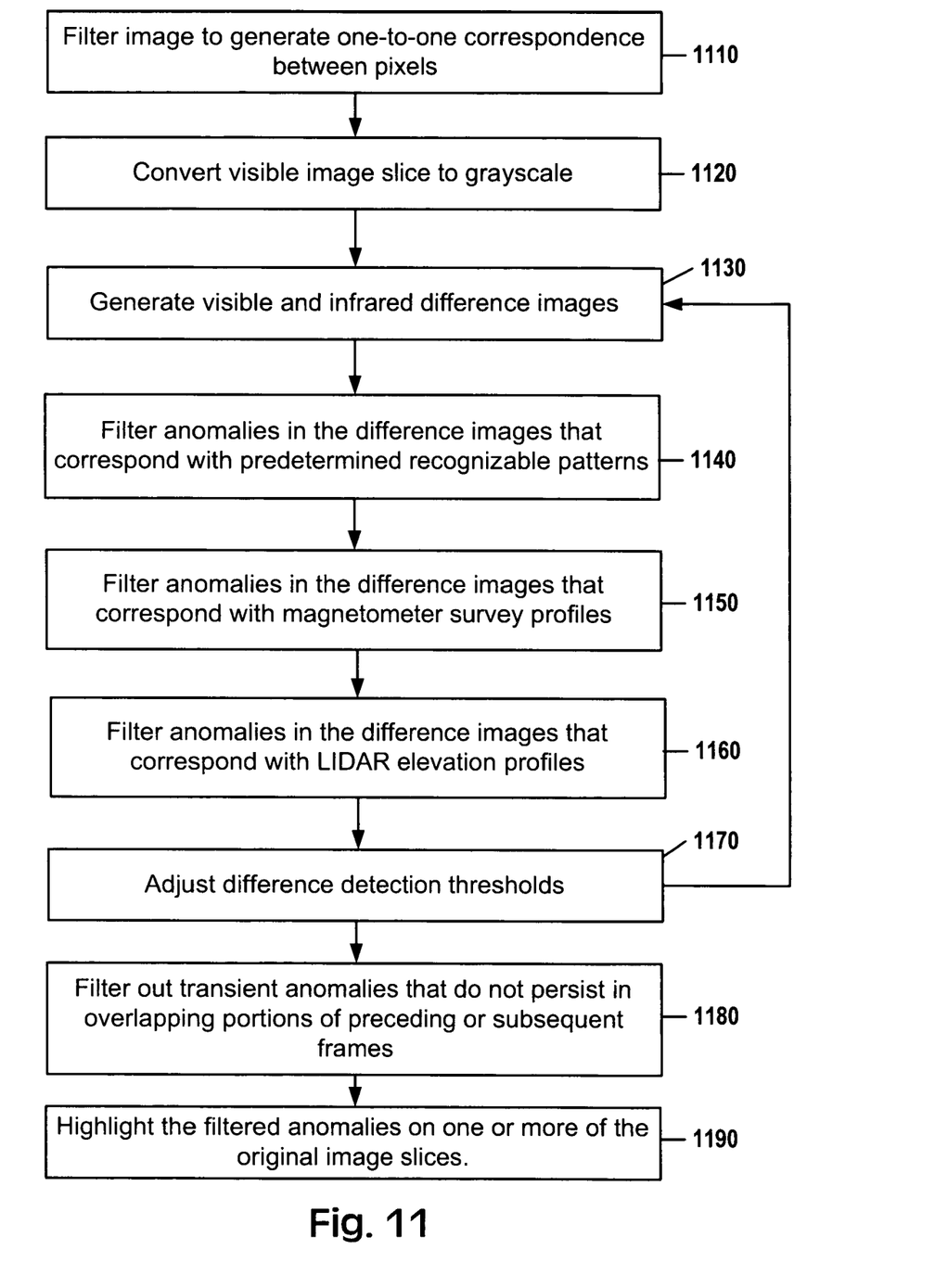
FIG. 11 is a functional block diagram of one embodiment of an automated method of processing a combination of visible, infrared, and magnetometer data to identify anomalies.

FIG. 11 illustrates an embodiment of a computer-automated process to digitally compare spatially correlated pixel data in the first and second images to identify anomalies and to digitally filter the anomalies to distinguish targeted anomalies from untargeted anomalies. This process works with a set of overlapping data slices comprising a combination of visible, infrared, and optionally also magnetometer and LIDAR elevation mapping data taken of a targeted terrestrial surface area to identify targeted hidden or invisible anomalies on or below the targeted terrestrial surface area. It is assumed that the infrared and visible images have already been orthorectified to each other or some other reference image. In step 1110, the pixel resolution of either the visible image slice or the infrared image slice is adjusted through pixel averaging until there is a one-to-one correspondence between pixels in the orthorectified image and infrared image slices. Non-overlapping remnants of the visible and infrared image slices are discarded. Alternatively, step 1110 is done as a part of the orthorectification process.

In step 1120, each pixel of the orthorectified visible image slice is converted to a single grayscale or intensity value. The visible image slice is converted to a grayscale resolution (e.g., 6 bits or 64 shades of gray) that matches the grayscale resolution of the infrared image slice. The variables used for normalization and grayscale conversion of the different components of the color model represented by each color image pixel are determined using an iterative process or artificial intelligence techniques to create an optimally close match between the grayscaled visible image slice and the infrared slice. Once the variables for grayscale conversion are determined, the same variables are used to convert each color pixel of the visible image frame to grayscale.

In one embodiment, an optimally close match between two images is one in which the greatest number of corresponding pixels have identical intensity values. In another embodiment, an optimally close match between two images is one in which the greatest number of corresponding pixels have nearly-equal intensity values. In yet another embodiment, identical pixel values are given one weight and near-equal intensity values are given weights of a lesser or greater value, and an optimally close match between two images is one which has the greatest or smallest sum of the weights.

Because the images are digitally represented, each image may be represented as an array. In step 1130, visible and infrared difference arrays or difference images are generated in which corresponding pixels having identical intensity values are given a value of zero, and where corresponding pixels having non-identical intensity values retain their original values. Alternatively, visible and infrared difference arrays or difference images are generated where intensity differences of corresponding pixels less than a given threshold are given a value of zero, and the remaining elements retain their original values. Non-zero values in the difference arrays identify potential anomalies. In yet another alternative, a single difference array is generated in which each element has a value equal to the absolute value of the difference between the intensity values of the corresponding elements of the visible and infrared image arrays.

Advantageously, the present invention includes a variety of automated techniques for filtering the difference arrays or images to filter the anomalies. In step 1140, standard pattern recognition techniques are used to filter anomalies in the difference images. For example, pattern recognition techniques may be used to identify straight-line anomalies corresponding to a buried pipeline. In step 1150, the difference images are compared with magnetometer survey data to separate anomalies that have also been picked up by the magnetometer survey from anomalies that have not been picked up by the magnetometer survey. In step 1160, the difference images are compared with LIDAR elevation profiles to intelligently separate surface anomalies from subsurface anomalies. For example, this comparison may be used to separate anomalies found on flat or gently sloping surface portions from anomalies generated by buildings, cars, and other structures on the surface.

Each of steps 1140, 1150, and 1160 are optional anomaly filtering techniques. Use of any one or any combination of those steps is considered to fall within the scope of the present invention. In step 1170, the entire process of steps 1130-1160 may optionally be repeated iteratively using different difference detection thresholds. In step 1180, the filtered anomalies may be filtered yet again by comparing different sets of frames to eliminate anomalies that do not persist in overlapping portions of preceding or subsequent frames. This eliminates noisy anomalies. In step 1190, the remaining filtered anomalies are highlighted on one or more of the original image slices. Furthermore, the anomalies may be highlighted on a series of frames to create a video or animation that depicts the anomalies. Preferably, steps 1110-1190 are computer-automated, meaning that after initialization (which may involve some human input), the steps are automatically performed without intensive ongoing human feedback to assist the image manipulation and pattern recognition processes. This is in contrast to using an image manipulation program like Adobe Photoshop® to manually and inconsistently manipulate images on a frame by frame basis without the assistance of macros or other automatic image rendering batch processes.

Although the foregoing specific details describe various embodiments of the invention, persons reasonably skilled in the art will recognize that various changes may be made in the details of the apparatus of this invention without departing from the spirit and scope of the invention as defined in the appended claims. Therefore, it should be understood that, unless otherwise specified, this invention is not to be limited to the specific details shown and described herein.

What is claimed is:

1. A method of remotely sensing and identifying subsurface characteristics of a terrestrial region, the method comprising:
    moving an aircraft equipped with a multispectral data acquisition system over a terrestrial region, said multispectral data acquisition system including:
        a computer to receive, store, and process data;
        a first imaging sensor communicatively coupled with said computer and operable to capture images in a visible band of the electromagnetic spectrum;
        a second imaging sensor communicatively coupled with said computer and operable to capture images in an infrared band of the electromagnetic spectrum, and being mounted relative to the first imaging sensor so that one of the two simultaneously-captured images from the first and second imaging sensors will substantially overlap the other;
        a magnetometer array to detect disturbances in the earth's magnetic field caused by objects on or near the terrestrial surface, the magnetometer array being in communication with said computer;
        a laser emitter and detector system in communication with said computer to facilitate computation of the distance between the laser emitter and a point on the terrestrial region below, thereby to enable generation of a three-dimensional elevation model of the terrestrial region;
        a global positioning satellite receiver tuned to receive positional data derived from global positioning satellites, said global positioning satellite receiver being communicatively coupled with said computer;
    capturing a first image with said first imaging sensor;
    simultaneously capturing a second image with said second imaging sensor;
    simultaneously capturing magnetic field data with said magnetometer array;
    simultaneously surveying the terrestrial region with the laser emitter and detector system;
    recording said first image, said second image, said magnetic field data, data from said laser emitter and detector system, and correlative spatial reference information received from the global positioning satellite receiver;
    generating a magnetometer survey map with said magnetic field data;
    spatially correlating the first and second images and magnetometer survey map with each other to enable spatially correlated comparisons between the first image, second image, and magnetometer survey map;
    digitally comparing the spatially correlated first and second images to identify anomalies; and
    digitally filtering said anomalies that spatially correspond with recorded distortions in the magnetic field data.

2. The method of claim 1, further comprising the step of converting the first image to a grayscale image.

3. The method of claim 1, further comprising the steps of:
    generating a digital elevation model of the terrestrial region using the data recorded from said laser detector and emitter system;
    spatially correlating the first and second images and digital elevation model with each other to enable spatially correlated comparisons between the first image, second image, and digital elevation model;
    digitally comparing the spatially correlated first and second images to identify anomalies; and
    with the aid of said digital elevation model, digitally filtering said anomalies that spatially correspond with flat or gently sloping areas of the terrestrial region.

\* \* \* \* \*